(12) United States Patent
Del Regno et al.

(10) Patent No.: US 11,333,772 B2
(45) Date of Patent: May 17, 2022

(54) STATIC VIRTUAL REFERENCE STATION AGENTS FOR GLOBAL NAVIGATION SATELLITE SYSTEM CORRECTIONS

(71) Applicant: Verizon Patent and Licensing Inc., Arlington, VA (US)

(72) Inventors: Christopher N. Del Regno, Rowlett, TX (US); Ashish Sardesai, Ashburn, VA (US); Mohammed M. Rahman, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 559 days.

(21) Appl. No.: 16/362,093

(22) Filed: Mar. 22, 2019

(65) Prior Publication Data

US 2020/0301026 A1  Sep. 24, 2020

(51) Int. Cl.
*G01S 19/41* (2010.01)
*G01S 19/07* (2010.01)
*G01S 19/43* (2010.01)

(52) U.S. Cl.
CPC .............. *G01S 19/41* (2013.01); *G01S 19/07* (2013.01); *G01S 19/071* (2019.08); *G01S 19/073* (2019.08); *G01S 19/43* (2013.01)

(58) Field of Classification Search
CPC ...... G01S 19/07; G01S 19/071; G01S 19/073; G01S 19/41; G01S 19/43
See application file for complete search history.

(56) References Cited

U.S. PATENT DOCUMENTS

| | | | |
|---|---|---|---|
| 7,313,398 B1 * | 12/2007 | Ramahi | H04W 24/00 370/329 |
| 2005/0064878 A1 * | 3/2005 | O'Meagher | G01S 19/071 455/456.1 |
| 2018/0246218 A1 * | 8/2018 | Zhang | G01S 19/071 |
| 2018/0246219 A1 * | 8/2018 | Zhang | G01S 19/071 |
| 2018/0246220 A1 * | 8/2018 | Zhang | G01S 19/071 |
| 2020/0084586 A1 * | 3/2020 | Ryden | H04W 76/40 |

OTHER PUBLICATIONS

Encyclopedia Entry, What is the basic structure of a computer system? What are the three main elements of the central processing unit? The Hutchinson Unabridged Encyclopedia with Atlas and Weather Guide. Abington, UK: Helicon. Retrieved from (Year: 2018).*
[Item U continued] https://search.credoreference.com/content/entry/heliconhe/what_is_the_basic_structure_of_a_computer_system_what_are_the_three_main_elements_of_the_central_processing_unit/ (Year: 2018).*

* cited by examiner

*Primary Examiner* — Bernarr E Gregory
*Assistant Examiner* — Fred H Mull

(57) ABSTRACT

A microservice node can include a network real-time kinematics (RTK) device to receive raw satellite data associated with a physical reference station via a first message in a first message queue, to receive static virtual location data associated with a static virtual reference station (VRS) agent, to generate corrections data for the static VRS agent based on the raw satellite data and the static virtual location data, and to transmit the corrections data to the static VRS agent. The microservice node can include the static VRS agent to publish the corrections data in a second message in a second message queue. The microservice node can include an adapter device to determine that the client device is located within a geographic area associated with the static VRS agent and to transmit the corrections data from the second message queue to the client device.

20 Claims, 12 Drawing Sheets

STATIC VIRTUAL REFERENCE STATION AGENTS FOR GLOBAL NAVIGATION SATELLITE SYSTEM CORRECTIONS

BACKGROUND

Global Navigation Satellite System (GNSS) is a generic term for a satellite navigation system that provides autonomous geo-spatial positioning with global coverage. The most ubiquitous of these technologies is the Global Positioning System (GPS).

DETAILED DESCRIPTION OF PREFERRED EMBODIMENTS

Figure 1A:
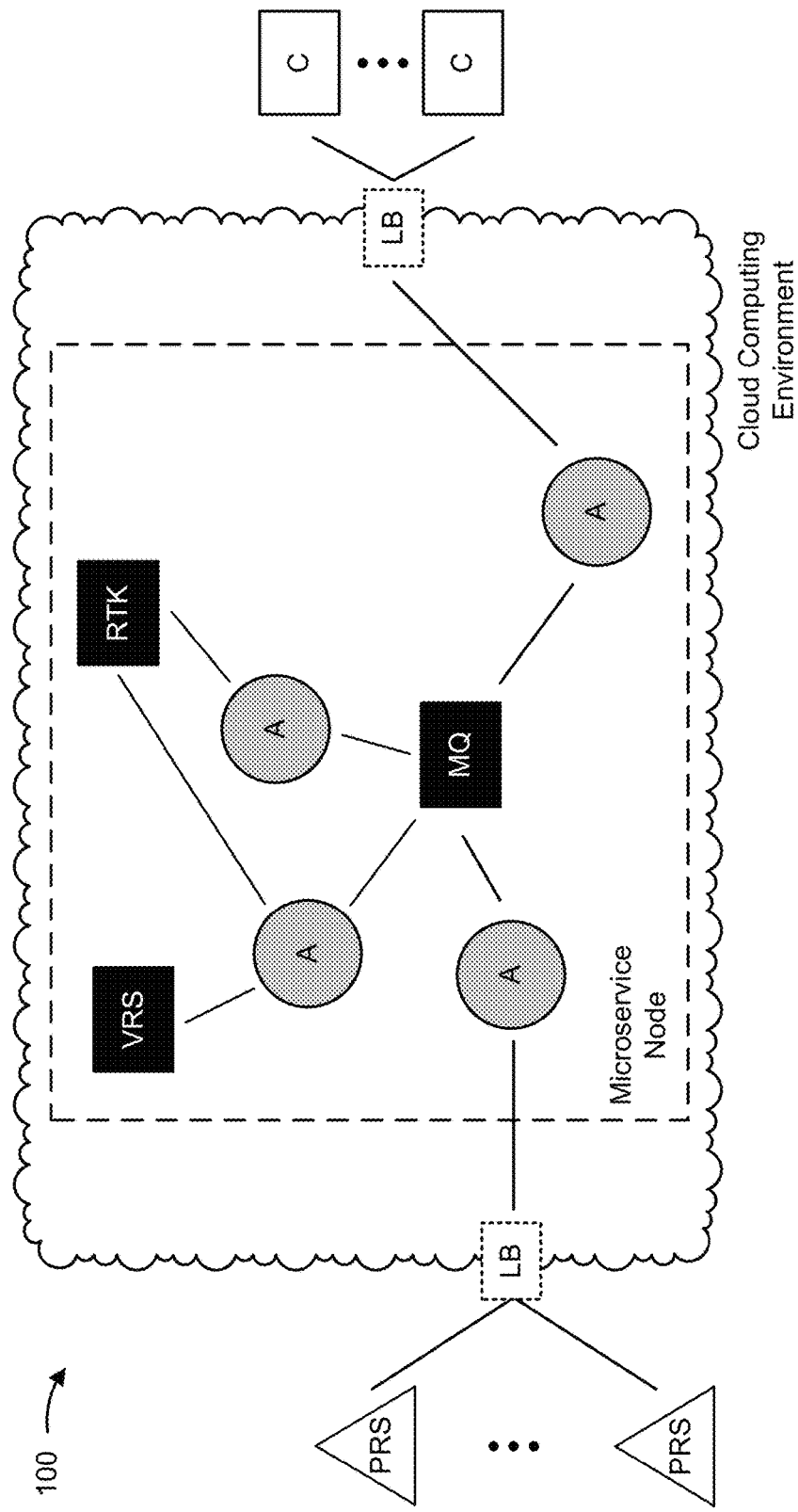
FIGS. 1A-1F are diagrams of an example implementation described herein.

The following detailed description of example implementations refers to the accompanying drawings. The same reference numbers in different drawings can identify the same or similar elements.

A global navigation satellite system (GNSS) signal in space provides a worst-case pseudo-range accuracy of 7.8 meters at a 95% confidence level, before any terrestrial biases or errors are introduced, such as ionospheric delay, tropospheric delay, receiver noise, receiver clock errors, signal multipath, and/or the like. These errors can introduce further inaccuracy and/or imprecision (e.g., by several meters).

This level of inaccuracy and imprecision can be tolerated in some applications. For example, a driver of a vehicle can be directed to a wrong side of a building, a block away from a target location, and/or the like, but such inaccuracy and imprecision can be overcome in practice (e.g., when the driver can circle the building, when the driver can see the target location despite being inaccurately directed, and/or the like). However, in many other applications, these limitations could lead to catastrophic results. For example, in an autonomous vehicle application these limitations can result in an autonomous vehicle not being in a right lane to make a turn or pick up a passenger, the autonomous vehicle identifying a curb as a street, the autonomous vehicle drifting into oncoming traffic, and/or the like. Other examples of applications in which such inaccuracy or imprecision cannot be tolerated include autonomous drones, mobile robotics, precision advertising, and many others.

Real-Time Kinematics (RTK) is one solution that allows for GNSS corrections to vastly improve location positioning in order to provide a hyper-accurate location service. RTK leverages a phase of a carrier, without regard to information modulated on the carrier and, as such, can provide greater accuracy, approaching millimeter precision. RTK relies on fixed and well-surveyed physical reference stations to transmit corrections data to in-range RTK-enabled client devices. Because a given physical reference station is well-surveyed, an actual position of the physical reference station is known. Here, the physical reference station receives raw satellite data from a group of GNSS satellites and transmits the raw satellite data to and the known location of the physical reference station to an RTK-enabled receiver. The RTK-enabled receiver can use the raw satellite data and the known location of the physical reference station to determine corrections data needed to adjust a given satellite's estimated signal location in order to determine a more accurate physical location. The RTK-enabled receiver can use the corrections data to correct a GNSS-estimated physical location of the RTK-enabled receiver in order to determine a hyper-accurate physical location of the RTK-enabled receiver.

With RTK, accuracy and precision are high within approximately 10 kilometers (km) of the physical reference station for single-frequency RTK-enabled receivers and within approximately 20 km for dual/multi-frequency RTK-enabled receivers. Due to the drop-off of accuracy and precision after 10-20 km from a physical reference station, a large quantity of physical reference stations (e.g., 20,000 or more for the continental United States) can need to be deployed in a given geographic area in order to provide a hyper-accurate location service, which requires a large time and financial investment, as well as complicated handover procedures between stations.

One solution to reduce the quantity of physical reference stations that is needed to provide a hyper-accurate location service is to implement a network RTK engine. A network RTK engine can include a cloud-based RTK engine that can generate a model of the terrestrial biases and/or errors in a geographic area between physical reference stations, and can transmit corrections data (e.g., reference data, from a physical reference station, that is modified based on the modeled terrestrial biases and/or errors in the geographic area between physical reference stations) to in-range client devices. This permits physical reference stations to be positioned further apart (e.g., 50-70 km) than without the network RTK engine, which reduces the quantity of physical reference stations (e.g., 1,500-2,000 for the continental United States) that needs to be deployed in a given geographic area in order to provide a hyper-accurate location service. Moreover, this permits the corrections data to be transmitted to client devices from the network RTK engine via a private and/or public network such as the Internet, which decouples the client devices from the physical reference stations.

To transmit corrections data to a client device, the network RTK engine can receive physical location data associated with the client device (e.g., which identifies a network-estimated or GNSS-estimated physical location of the client device), and can generate a virtual reference station (VRS), dedicated to the client device, based on the location data of the client device. The network RTK engine can then transmit corrections data, using the VRS, by receiving reference data from nearby physical reference stations and generating the corrections data by modifying the reference data based on the modeled terrestrial biases and/or errors at the location of the VRS. In this way, the VRS functions as a reference station that is located at or very close to the location of the client device in order to provide a hyper-accurate location service to the client device.

While a network RTK engine can reduce the quantity of physical reference stations that needs to be deployed in a given geographic area in order to provide a hyper-accurate location service, a network RTK engine can be limited in various ways. For example, a network RTK engine can suffer from a physical reference station scaling issue in that the network RTK engine can be capable of only supporting (i.e., modifying reference data for) a few hundred physical reference stations. As another example, a network RTK engine can suffer from a virtual reference station scaling issue in that the network RTK engine can be capable of providing dedicated VRSs to only thousands of client devices at a given time, while the quantity of client devices using the hyper-accurate location service can number in the millions. Thus, as the quantity of deployed physical and virtual reference stations increases, so too does the quantity of deployed network RTK engines to support the deployed physical and virtual reference stations. This increases the complexity of scaling and maintaining a hyper-accurate location service, increases the cost of scaling and maintaining a hyper-accurate location service, and/or the like, and likewise increases the cost associated with the complexities of handing over customer connections among multiple instances of network RTK engines.

Moreover, generating corrections data for a VRS is computationally intensive, and thus, generating corrections data for millions of client devices consumes significant network, processing, and memory resources. In addition, client devices that are located relatively near to each other can experience very little to no variation in corrections data. Accordingly, using dedicated VRSs for client devices that are located relatively near to each other can waste networking, processing, and memory resources on repeatedly generating corrections data that is essentially the same.

Some implementations described herein provide a cloud-based microservice node that is capable of generating and providing corrections data using static VRS agents. In some implementations, instead of generating dedicated VRSs on a per-client device basis, the microservice node can set up static (or fixed) VRS agents that are assigned to, and associated with, respective geographic areas. In this way, a single static VRS agent can provide a hyper-accurate location service to a plurality of client devices in an associated geographic area. This lessens the severity of the virtual reference station scaling issue, described above, in that, as more client devices connect to and consume the hyper-accurate location service, the quantity of static VRS agents that are deployed does not change. As a result, the complexity and cost of scaling and maintaining the hyper-accurate location service is reduced. Moreover, since a plurality of client devices can be served corrections data from the same static VRS agent, the disclosed cloud-based microservice node reduces networking, processing, and memory resources, relative to using dedicated VRSs, by reducing the repetitive generation of corrections data.

FIGS. 1A-1F are diagrams of an example implementation 100 described herein. In some implementations, example implementation 100 can illustrate the use of static VRS agents, in a microservice node, for providing a hyper-accurate location service. The microservice node can be communicatively connected with a plurality of geographically spaced apart (e.g., 50-70 km apart) physical reference stations and one or more client devices (e.g., RTK-enabled client devices).

The hyper-accurate location service can include a service that provides an accuracy of location to within centimeters (hyper accuracy) for a client device (e.g., an accuracy that is not capable of being provided by GNSS systems). This can improve performance of the client device, an application associated with the client device (e.g., a ride share application, an application associated with autonomous operation, and/or the like), and/or a service provided to a user of the client device (e.g., a ride sharing service, an autonomous navigation service, and/or the like).

The hyper-accurate location service can include, for example, a corrections microservice. In some implementations, the corrections microservice is a microservice for supplying a client device (e.g., a corrections client) with corrections data that can be used to correct a GNSS satellite-estimated physical location (or network-estimated location) of the client device, as observed by the client device. The client device can use the corrections data, along with other observables, to calculate a comparatively more accurate and/or precise physical location (e.g., as compared to using other GNSS methods).

In some implementations, the microservices described above can be provided by the microservice node. A microservice node includes a system (e.g., one or more devices) capable of providing a corrections microservice to one or more client devices. In some implementations, the microservice node can be at least partially implemented in a cloud computing environment, as shown.

As shown in FIG. 1A, the microservice node can include a message queue device, a network RTK device, a static VRS device, one or more adapter devices, and/or the like. The microservice node can be arranged to communicate with the plurality of physical reference stations and the one or more client devices.

As described above, a physical reference station can include one or more devices that receive raw satellite data from a group of GNSS satellites (and/or satellite constellations) and provide the raw satellite data, and the known physical location of the to the microservice node. The microservice node can use the raw satellite data to determine corrections data that is needed to adjust a given satellite's estimated signal location in order to generate an error model that can be used to provide a true/hyper-accurate physical location of the one or more client devices. The one or more client devices can include RTK-enabled devices that can be corrections clients of the hyper-accurate location service provided by the microservice node.

In regard to the microservice node, the message queue device includes one or more devices that can host, store, and/or transmit messages as part of a message queue for the microservice node. In some implementations, the message queue device can implement an Apache Kafka cluster that includes one or more message queues. The one or more message queues can include Kafka topics. The adapter devices can include Kafka producers that can store messages in a Kafka topic and/or Kafka consumers that can subscribe to a Kafka topic to receive alerts (e.g., alerts of messages being added to the Kafka topics) and read messages in a Kafka topic. In this way, the message queue device can provide a means for communication between the devices included in the microservice node, between a device included in the microservice node and an external device, between external devices that communicate via the microservice node, and/or the like. Moreover, load balancers can be appropriately arranged in order to balance traffic between one or more microservice nodes, between one or more devices included in a microservice node and one or more devices external to the microservice node (e.g., between a physical reference station and an adapter device, between a client device and an adapter device, and/or the like).

The network RTK device includes one or more devices that are capable of providing a network RTK engine for the microservice node. The network RTK engine can be capable of receiving raw satellite data from a physical reference station, can receive location data associated with a virtual reference station, can generate corrections data for the VRS based on the raw satellite data and the location data associated with the VRS, and/or the like.

The static VRS device includes one or more devices that are capable of generating and providing one or more static (or fixed) VRS agents. A static VRS agent can include a virtual reference station that is assigned to, and associated with, a particular geographic area. In some implementations, the geographic area can have various shapes, such as a circle, a hexagon, a square, and/or the like. In some implementations, the size of the geographic area can be based on the quantity of virtual reference stations that the network RTK device is capable of servicing, and can be sized such that the border of the geographic area (and thus, any client devices located in the geographic area) is not more than 10-20 km from the associated static VRS agent. In some implementations, the size of the geographic area can be increased or decreased for improved RTK performance at the expense of an increased quantity of static VRS agents. For example, tighter spacing of static VRS agents could be used in failure scenarios so that an adjacent static VRS agent can temporarily cover for a failed static VRS agent. In some implementations, the respective geographic areas, associated with the one or more static VRS agents, can be positioned such that the respective geographic areas are contiguous but do not overlap. In some implementations, the respective geographic areas, associated with the one or more static VRS agents, can be positioned such that the respective geographic areas at least partially overlap.

A static VRS agent can be assigned a static virtual location. The static virtual location can be static in that the static virtual location does not change. Moreover, the static virtual location can be virtual (or logical) in the sense that the static virtual location does not correspond to the actual physical location of the static VRS agent. Instead, the static virtual location, associated with the static VRS agent, can correspond to a physical location within the geographic area associated with the static VRS agent (e.g., at the center of the geographic area or off-center).

Figure 1B:
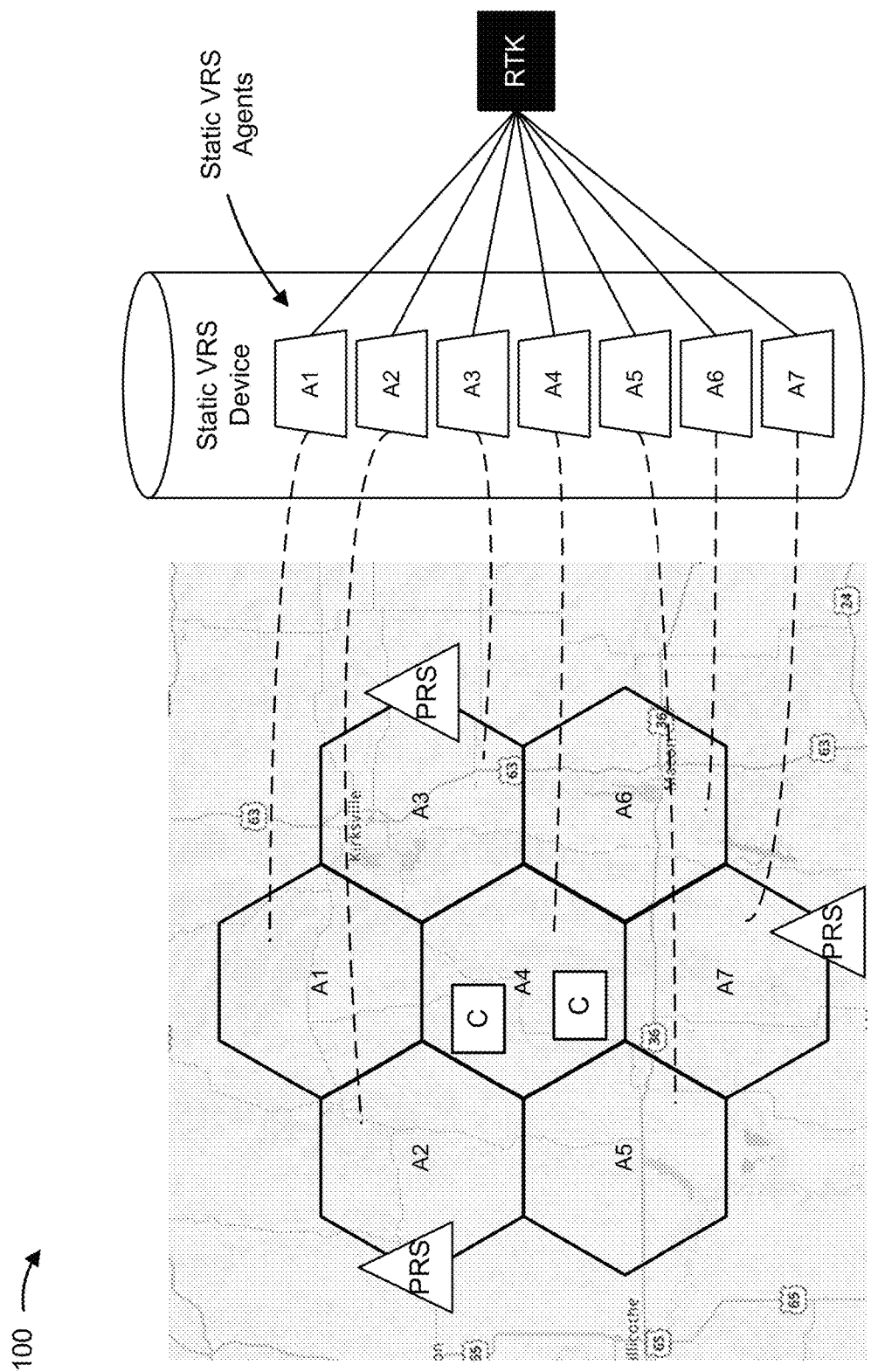

FIG. 1B illustrates an example geographic configuration for a plurality of VRS agents A1-A7. As shown in FIG. 1B, each static VRS agent can be associated with a hexagon-shaped geographic area. The network RTK engine can generate corrections data for a given geographic area based on static virtual location data associated with the static VRS agent that is associated with the geographic area, raw satellite data associated with one or more physical reference stations near the geographic area, and the known physical locations of the physical reference stations. In this way, the static VRS agent can transmit corrections data to all client devices that are located within the geographic area that is associated with the static VRS agent, instead of the network RTK engine generating dedicated virtual reference stations and generating separate corrections data for each of each of the client devices. As an example, FIG. 1B shows two client devices located within the geographic area associated with static VRS agent A4. In this example, static VRS agent A4 can transmit the same corrections data to both client devices, which conserves networking, processing, and/or memory resources that would have otherwise been wasted on generating separate corrections data for the client devices.

Figure 1C:
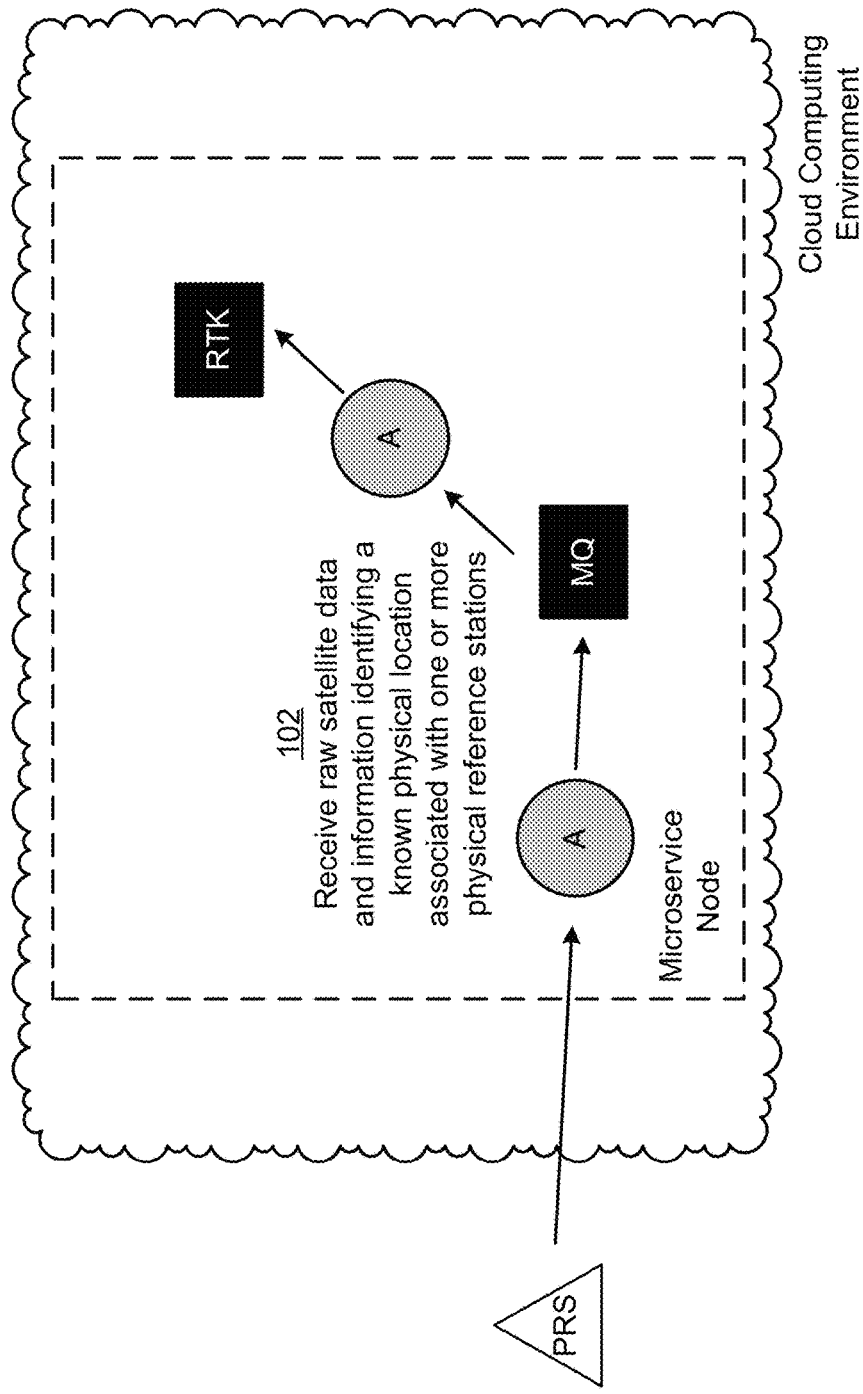

As shown in FIG. 1C, and by reference number 102, in order to generate corrections data for a static VRS agent, the network RTK device can receive raw satellite data associated with one or more physical reference stations and information identifying the known location of the one or more physical reference stations. The physical reference stations can be the closest physical reference stations to the static virtual location associated with the static VRS agent, can be physical reference stations that is located within a threshold distance of the static virtual location associated with the static VRS agent, can be the physical reference stations that are associated and/or managed by the network RTK device, and/or the like.

A physical reference station can post a message, to a message queue provided by the message queue device, that includes the raw satellite data and the known physical location associated with the physical reference station. The raw satellite data can include, for example, a satellite identifier associated with one or more GNSS satellites or satellite constellations (e.g., a pseudo-random noise sequence or Gold code that the satellite transmits to differentiate the satellite from other satellites in the satellite constellation), a constellation identifier associated with a satellite constellation, pseudo range observations associated with a satellite and/or each satellite included in a satellite constellation, phase range observations associated with a satellite and/or each satellite included in a satellite constellation (e.g., instantaneous carrier phase and cumulative quantity of complete phase cycles since a last loss of lock), delay observations associated with a satellite and/or each satellite included in a satellite constellation (e.g., delay of the pseudorandom code modulated on a given carrier), received signal strength for each carrier signal from a satellite and/or each satellite included in a satellite constellation, and/or the like. In some implementations, the message queue can be associated with the physical reference station (e.g., can be a Kafka topic that is associated with the physical reference station).

The physical reference station can transmit raw satellite data and the information identifying the known physical location to the message queue via an adapter device. The physical reference station can transmit the raw satellite data in a Networked Transport of Radio Technical Commission for Maritime Services (RTCM) via Internet Protocol (NTRIP) format. The adapter device can provide an NTRIP casting function, which can stream the raw satellite data to other devices included in the microservice node. The adapter device can further provide a Kafka producer function, which can publish the raw satellite data and the information identifying the known physical location, in the message, to the message queue.

The network RTK device can receive the message from the physical reference station via the message queue. For example, an adapter device, between the network RTK device and the message queue device, can provide a Kafka consumer function, which can subscribe to the message queue associated with the physical reference station (e.g., the Kafka topic associated with the physical reference station), can receive a notification that the message has been added to the message queue based on subscribing to the message queue, and can retrieve the message from the message queue based on receiving the notification.

Figure 1D:
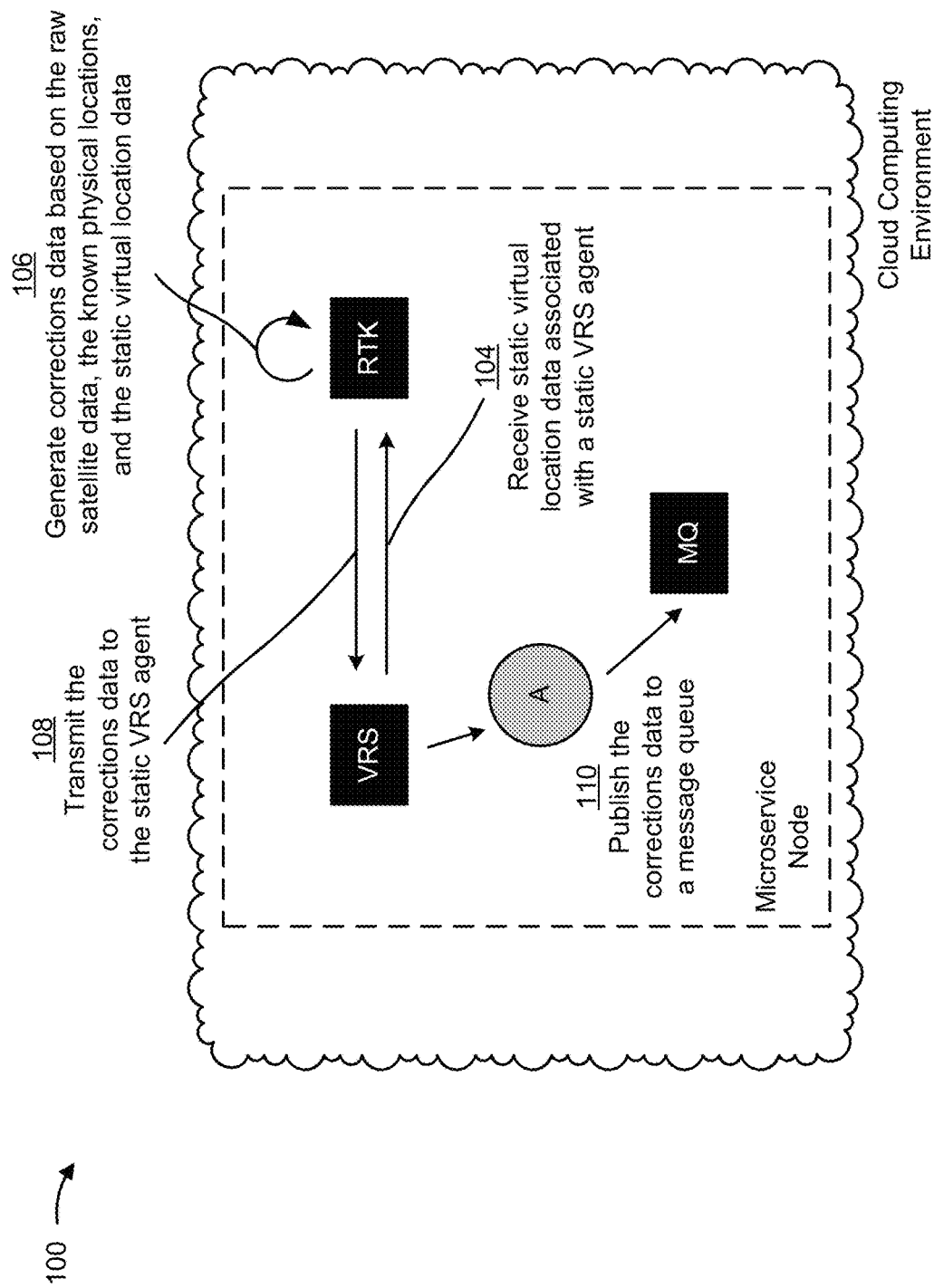

As shown in FIG. 1D, and by reference number 104, the network RTK device can receive, from the static VRS agent, static location data associated with the static VRS agent. The static virtual location data can include information identifying the static virtual location associated with the static VRS agent. In some implementations, the static VRS agent can transmit the static virtual location data directly to the network RTK device. In some implementations, the static VRS agent can transmit the static virtual location data to the network RTK device via a message queue associated with the static VRS agent (e.g., by publishing the static virtual location data in a message on the message queue). In some implementations, the static virtual location data can transmit the static virtual location data to the network RTK device based on receiving, from the network RTK device, a request for the static virtual location data.

As further shown in FIG. 1D, and by reference number 106, the network RTK device can use a network RTK engine to generate corrections data for the static VRS agent. For example, the network RTK engine can generate the corrections data based on the raw satellite data and the information identifying the known physical location of the one or more physical reference stations and the static virtual location data associated with the static VRS agent.

In some implementations, the corrections data can include information associated with terrestrial biases and/or errors associated with the static virtual location of the static VRS agent. The terrestrial biases and/or errors can include ionospheric delay, tropospheric delay, receiver noise, receiver clock errors, signal multipath, and/or the like. The network RTK engine can determine the terrestrial biases and/or errors based on the raw satellite data and the information identifying the known physical location associated with the one or more physical reference stations. For example, the network RTK engine can generate an error model for the overall geographic area to which the network RTK engine is assigned (i.e., the collective geographic area that is covered by the static VRS agents to which the network RTK engine is assigned) by using the known physical locations of the one or more physical reference stations to determine the terrestrial biases and/or errors associated with the raw satellite data received at the one or more physical reference stations. The network RTK engine can generate the error model by interpolating the terrestrial biases and/or errors across the overall geographic area to which the network RTK engine is assigned. The network RTK engine can then select the interpolated terrestrial biases and/or errors, at the static virtual location, as part of the corrections data for the static VRS agent.

As further shown in FIG. 1D, and by reference number 108, the network RTK device can transmit the corrections data to the static VRS agent. In some implementations, the network RTK device can transmit the corrections data to the static VRS agent based on generating the corrections data. In some implementations, the network RTK device can transmit the corrections data to the static VRS agent based on receiving a request, from the static VRS agent, for the corrections data. In some implementations, the network RTK device can transmit the corrections data directly to the static VRS agent. In some implementations, the network RTK device can transmit the corrections data to the static VRS agent via one or more adapter devices and/or a message queue associated with the network RTK device.

As further shown in FIG. 1D, and by reference number 110, the static VRS agent can receive the corrections data and can publish the corrections data in a message queue associated with the static VRS agent. In this way, the static VRS agent can transmit, via the message queue, the corrections data to client devices that are located within the geographic area associated with the static VRS agent as part of the hyper-accurate location service provided by the microservice node.

Figure 1E:
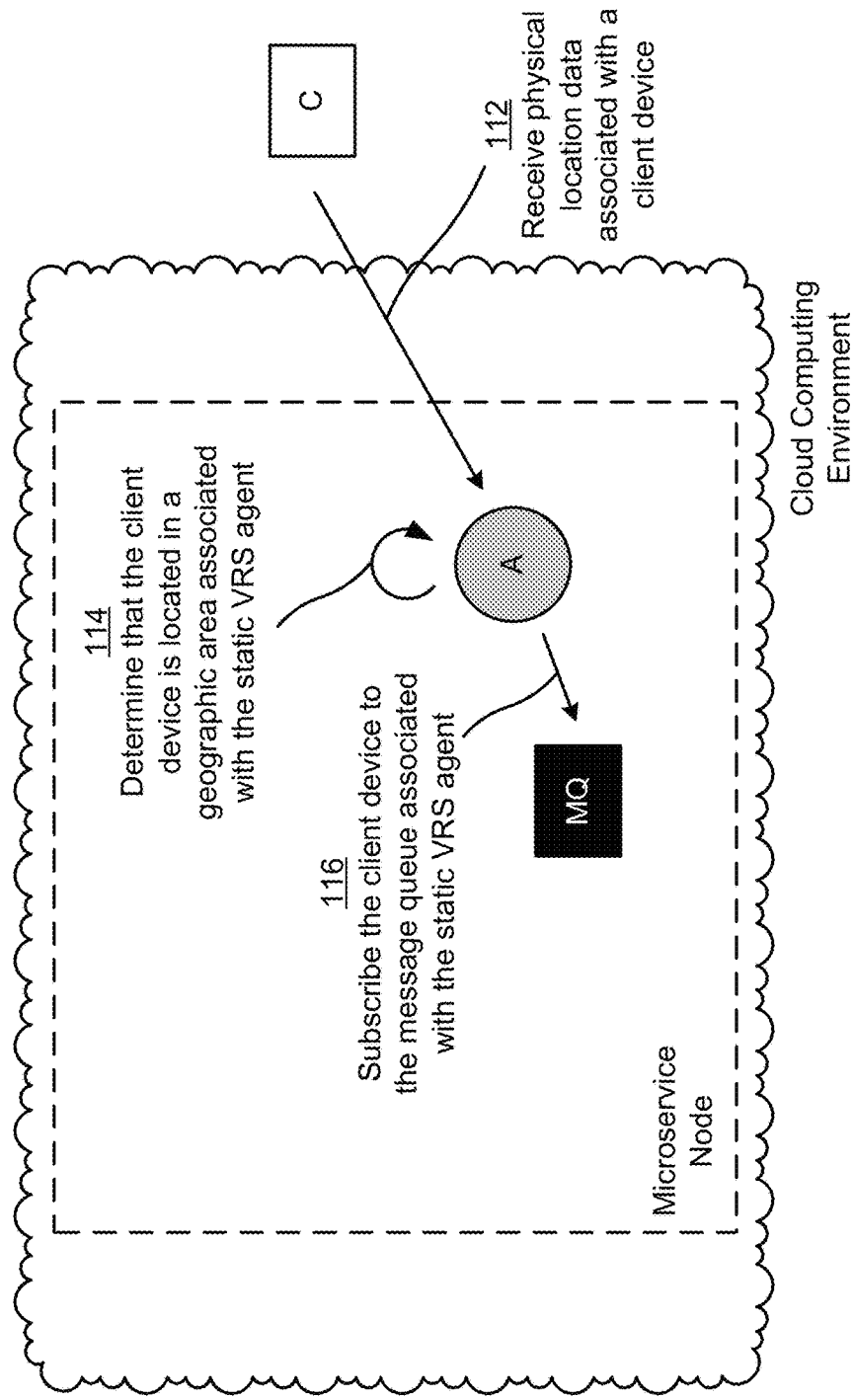

As shown in FIG. 1E, and by reference number 112, an adapter device between a client device and the message queue device can receive, from the client device (e.g., a corrections client), a request for the corrections data associated with the static VRS agent. The request can include the client device logging onto a web portal or application associated with the hyper-accurate locations service (e.g., the client device providing a username and password, the client device providing a valid authentication token, and/or the like). The request can also include physical location data associated with the client device, which can identify a network-estimated or GNSS satellite-estimated physical location of the client device. In some implementations, a load balancer (e.g., an Internet load balancer) can direct the request to an adapter device between the client device and the message queue device, which can provide a corrections as a service (CaaS) function to the client device. The CaaS function can be part of the overall hyper-accurate location service provided by the microservice node.

As further shown in FIG. 1E, and by reference number 114, the CaaS function can receive the request and can determine that the client device is located in a geographic area associated with the static VRS agent. For example, the CaaS function can determine that the client device is located in a geographic area associated with the static VRS agent based on the physical location data, associated with the client device, indicated in the request.

As further shown in FIG. 1E, and by reference number 116, the adapter device can provide a Kafka consumer function, which can subscribe the client device to the message queue associated with the static VRS agent based on the CaaS function determining that the client device is located in the geographic area associated with the static VRS agent. If the client device's GNSS satellite-estimated physical location changes while consuming the hyper-accurate location service, such that the client device relocates to a geographic area associated with another static VRS agent, the CaaS function of the adapter device can determine that the client device relocated to the geographic area associated with the other static VRS agent and can instruct the CaaS function of the adapter device to subscribe the client device to the message queue associated with the other static VRS agent so that the client device can receive corrections data associated with the other static VRS agent. Moreover, if the CaaS function determines that the closest reference station to the client device's GNSS satellite-estimated (or network-estimated) physical location is a physical reference station, the CaaS function can determine to transmit the corrections data directly from the physical reference station.

Figure 1F:
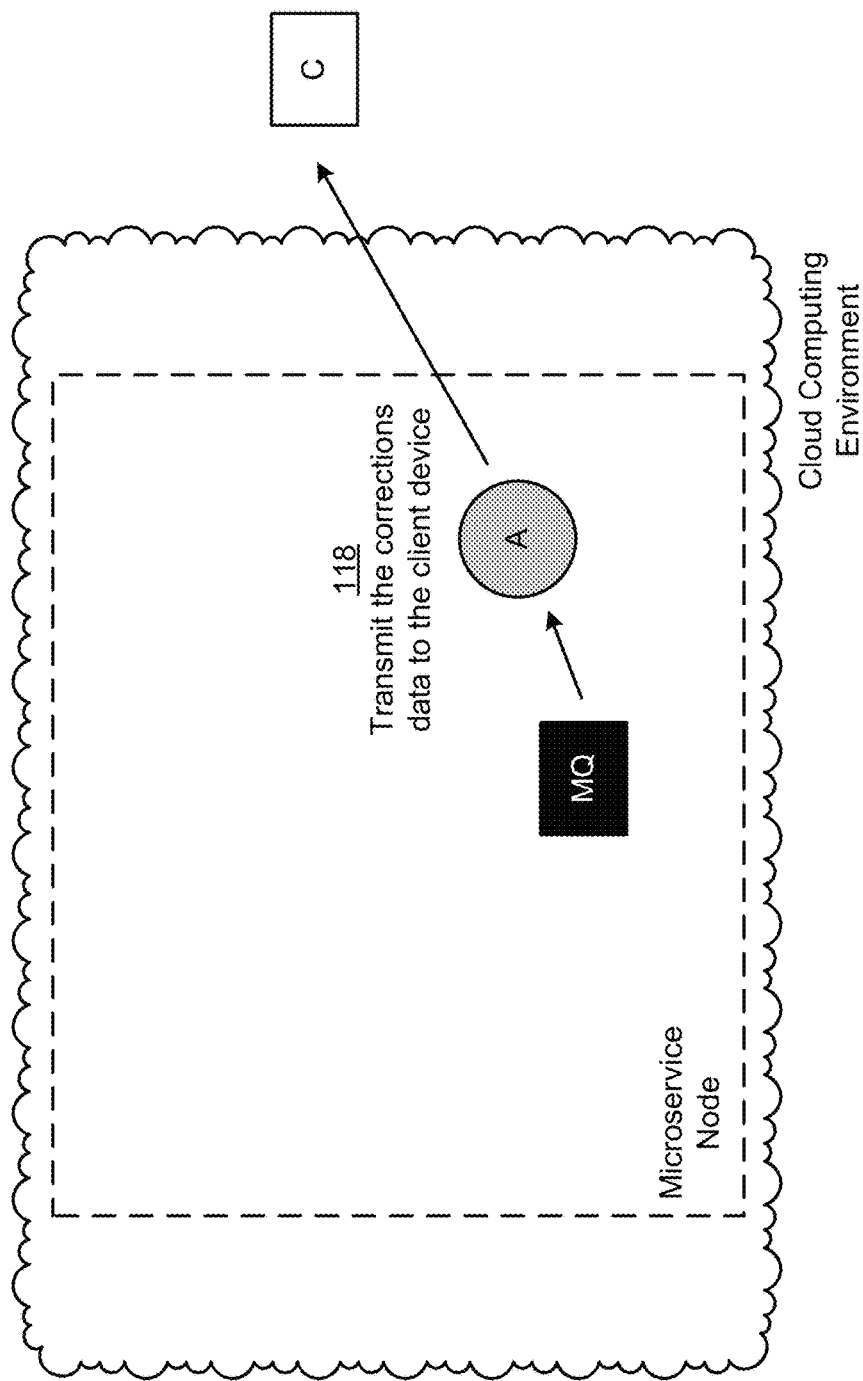

As shown in FIG. 1F, and by reference number 118, the adapter device can receive a notification that a message including the corrections data associated with the static VRS agent has been added to the message queue associated with the static VRS agent. Accordingly, the adapter device, via the Kafka consumer function, can retrieve the message from the message queue based on receiving the notification, and the CaaS function of the adapter device can transmit the corrections data to the client device.

In this way, instead of generating dedicated VRSs on a per-client device basis, the microservice node can set up static (or fixed) VRS agents that are assigned to, and associated with, respective geographic areas. In this way, a single static VRS agent can provide a hyper-accurate location service to a plurality of client devices in an associated geographic area, which decouples the client devices from the network RTK engine included in the microservice node that generates corrections data for the static VRS agents. This lessens the severity of virtual reference station scaling in that, as more client devices connect to and consume the corrections data, the quantity of static VRS agents that are deployed does not change. As a result, the complexity and cost of scaling and maintaining the hyper-accurate location service is reduced. Moreover, since a plurality of client devices can be served corrections data from the same static VRS agent, the disclosed cloud-based microservices architecture reduces networking, processing, and memory resources, relative to using dedicated VRSs, by reducing the repetitive generation of corrections data that is essentially the same.

As indicated above, FIGS. 1A-1F are provided merely as an example. Other examples can differ from what is described with regard to FIGS. 1A-1F. For example, while a single microservice node is shown in FIGS. 1A-1F, multiple microservice nodes can be configured (e.g., multiple microservice nodes can be configured on computing resources of the cloud computing environment). In some implementations, one or more microservice nodes can form a hyper-accurate location platform. In other words, one or more microservice nodes can, collectively, operate as a hyper-accurate location platform such that microservices can be provided to hundreds, thousands, or even millions of client devices based on raw satellite data from hundreds or thousands of reference stations.

Further, FIGS. 1A-1F illustrate a microservice node as including a message queue device, a single static VRS device, and a single network RTK device. However, in some implementations, a given microservice node can include one or more of each of these devices. In other words, in practice, a given microservice node can include one or more message queue devices, one or more static VRS devices, one or more network RTK devices, and/or a greater or fewer quantity of adapter devices. In some implementations, load balancers can be appropriately arranged in order to balance traffic between one or more message queue devices, one or more static VRS devices, one or more network RTK devices, and/or one or more adapter devices.

Figure 2A:
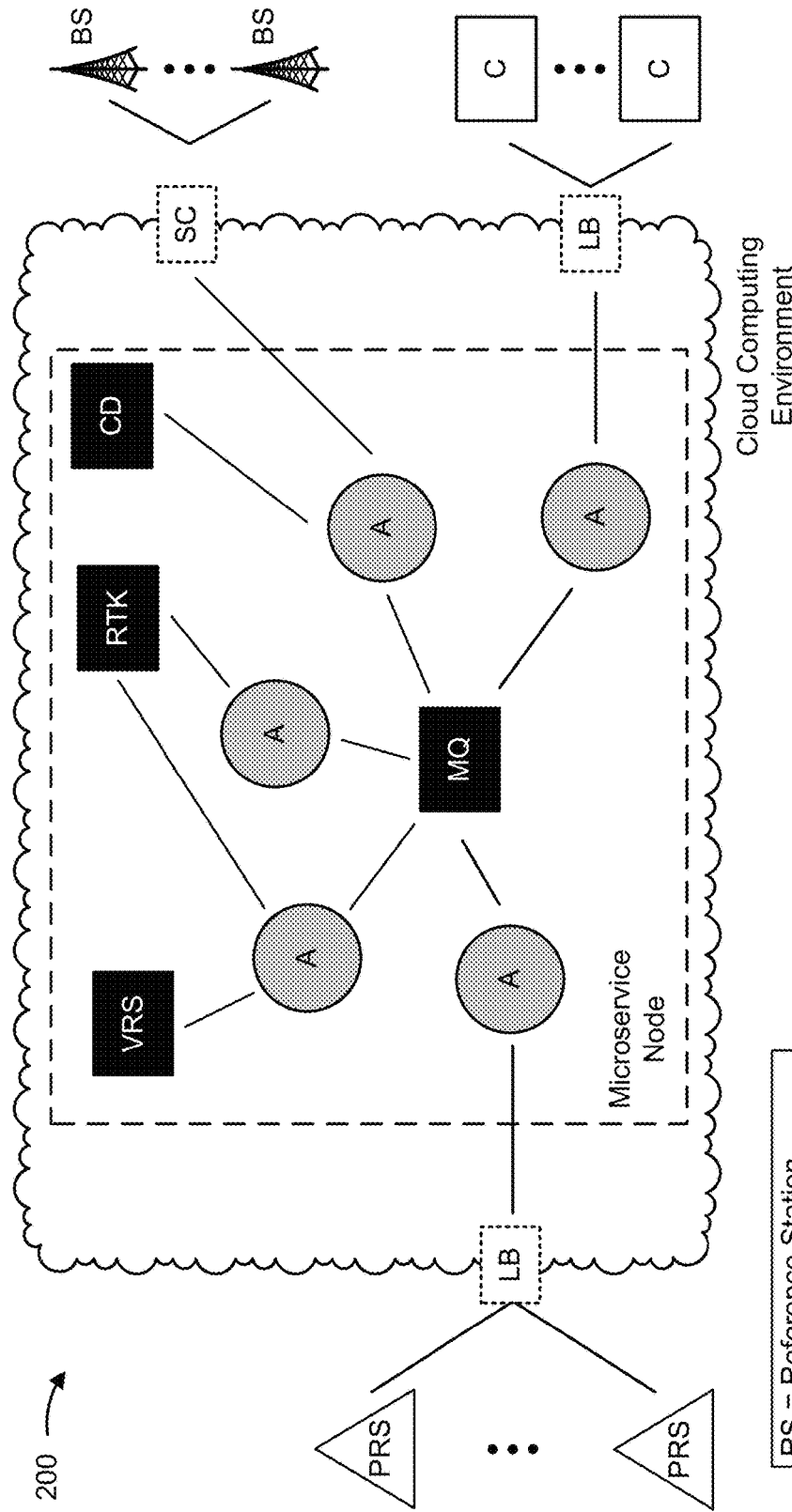
FIGS. 2A and 2B are diagrams of an example implementation described herein.
Figure 2B:
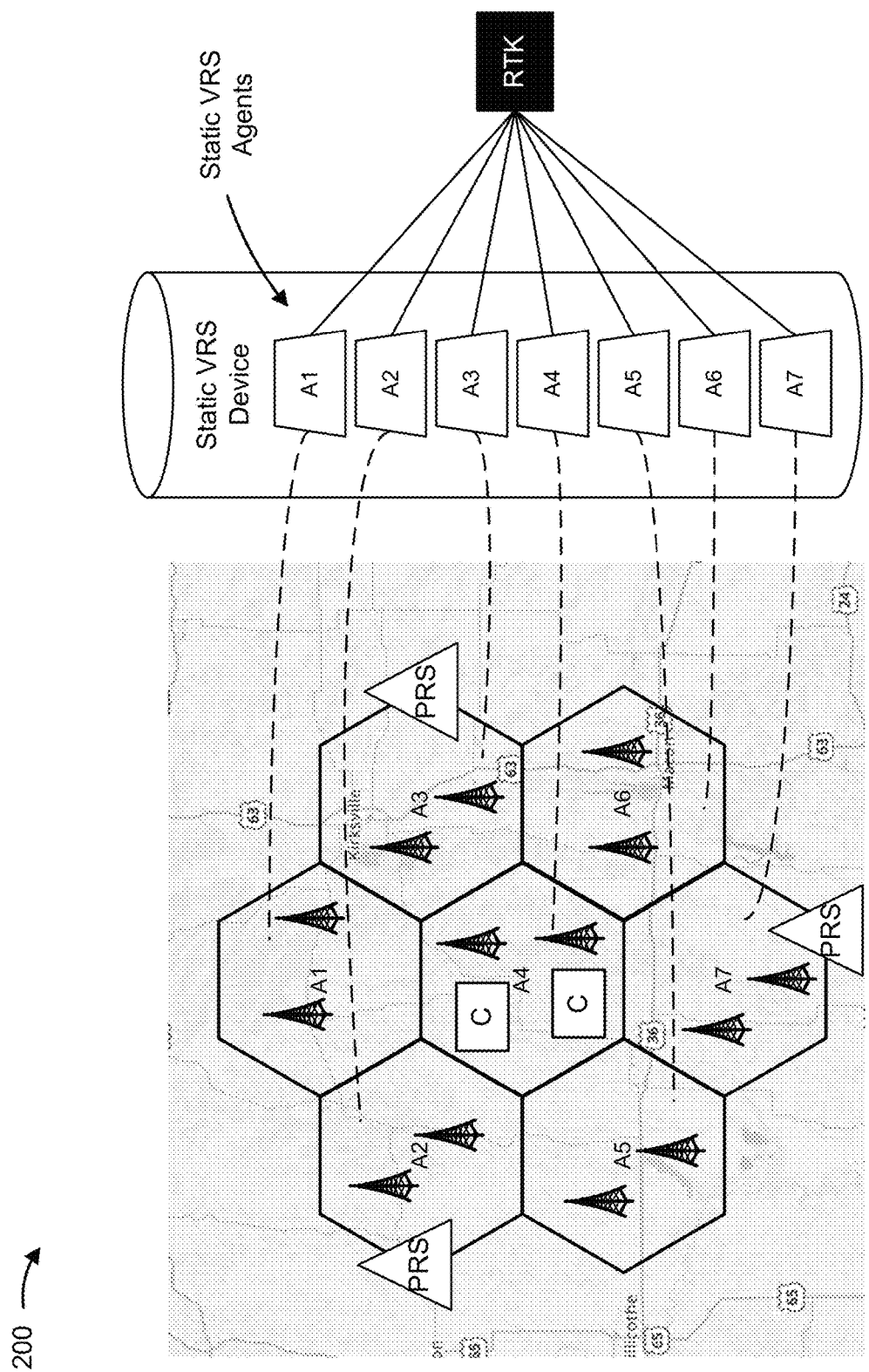

FIGS. 2A and 2B are diagrams of an example implementation 200 described herein. In some implementations, example implementation 200 can illustrate the use of static VRS agents, in a microservice node, for providing a hyper-accurate location service. As shown in FIG. 2A, the microservice node in example implementation 200 includes devices similar to those of the microservice node in example implementation 100 (e.g., a message queue device, a static VRS device, a network RTK device, a plurality of adapter devices, and/or the like), except that the microservice node in example implementation 200 includes a cellular delivery device and associated adapter device for transmitting corrections data to client devices via a cellular network.

The cellular delivery device includes one or more devices that can instruct the adapter device, between the cellular delivery device and the message queue device, to subscribe to particular message queues associated with one or more static VRS agents. The adapter device, via a Kafka consumer function, can read messages from the message queues in order to transmit corrections data, associated with the one or more static VRS agents, to one or more base stations located in the respective geographic areas associated with the one or more static VRS agents.

Client devices that use the hyper-accurate location service can receive corrections data over-the-air from the one or more base stations. The corrections data can be transmitted by a base station in a system information block (SIB), in a downlink control information (DCI) communication, in a radio resource control (RRC) communication, and/or the like. The corrections data can be transmitted to a base station via a serving center device associated with the base station, which can include a broadcast multicast service center (BMSC) device, an evolved serving mobile location center (E-SMLC) device, and/or another type of device that provides multimedia broadcast multicast services.

For a client device to receive corrections data associated with a static VRS agent, the adapter device, between the client device and the message queue device, can receive a request for the corrections data from the client device, and can identify the base station (e.g., based on the client device being communicatively connected to the base station, based on the base station being located in the same geographic area as the client device, and/or the like). The adapter device can identify the static VRS agent, that is associated with the geographic area in which the client device is located (e.g., based on which base station the client device is communicatively connected with), and can subscribe the client device to the message queue associated with the static VRS device. The adapter device can subsequently determine that a message, that includes the corrections data, has been added to the message queue, and can use the Kafka consumer function to read the message and transmit the corrections data to the client device via the serving center device and the base station.

FIG. 2B illustrates an example geographic configuration for a plurality of VRS agents A1-A7. As shown in FIG. 2B, each static VRS agent can be associated with a hexagon-shaped geographic area. Moreover, the base stations, that are located within a geographic area associated with a static VRS agent, can be associated with the static VRS agent, and thus can transmit corrections data associated with the static VRS agent. As an example, FIG. 2B shows two client devices located within the geographic area associated with static VRS agent A4. In this example, the base stations that are located within the geographic area associated with static VRS agent A4 can transmit the same corrections data to both client devices (e.g., over the air), which conserves networking, processing, and/or memory resources that would have otherwise been wasted on generating and transmitting separate corrections data for the client devices. As a client device is handed over between base stations within a geographic area that is associated with the same static VRS agent, the client device can continue to receive the same corrections data associated with the static VRS agent. Once the client device is handed over to a base station that is located in a geographic area that is associated with another static VRS agent (e.g., static VRS agent A5), the adapter device can subscribe the client device to the message queue associated with the other static VRS agent so that the client device can receive corrections data associated with the other static VRS agent (e.g., over the air via the base stations located in the geographic area associated with the other static VRS agent).

As indicated above, FIGS. 2A and 2B are provided merely as an example. Other examples can differ from what is described with regard to FIGS. 2A and 2B.

Figure 3A:
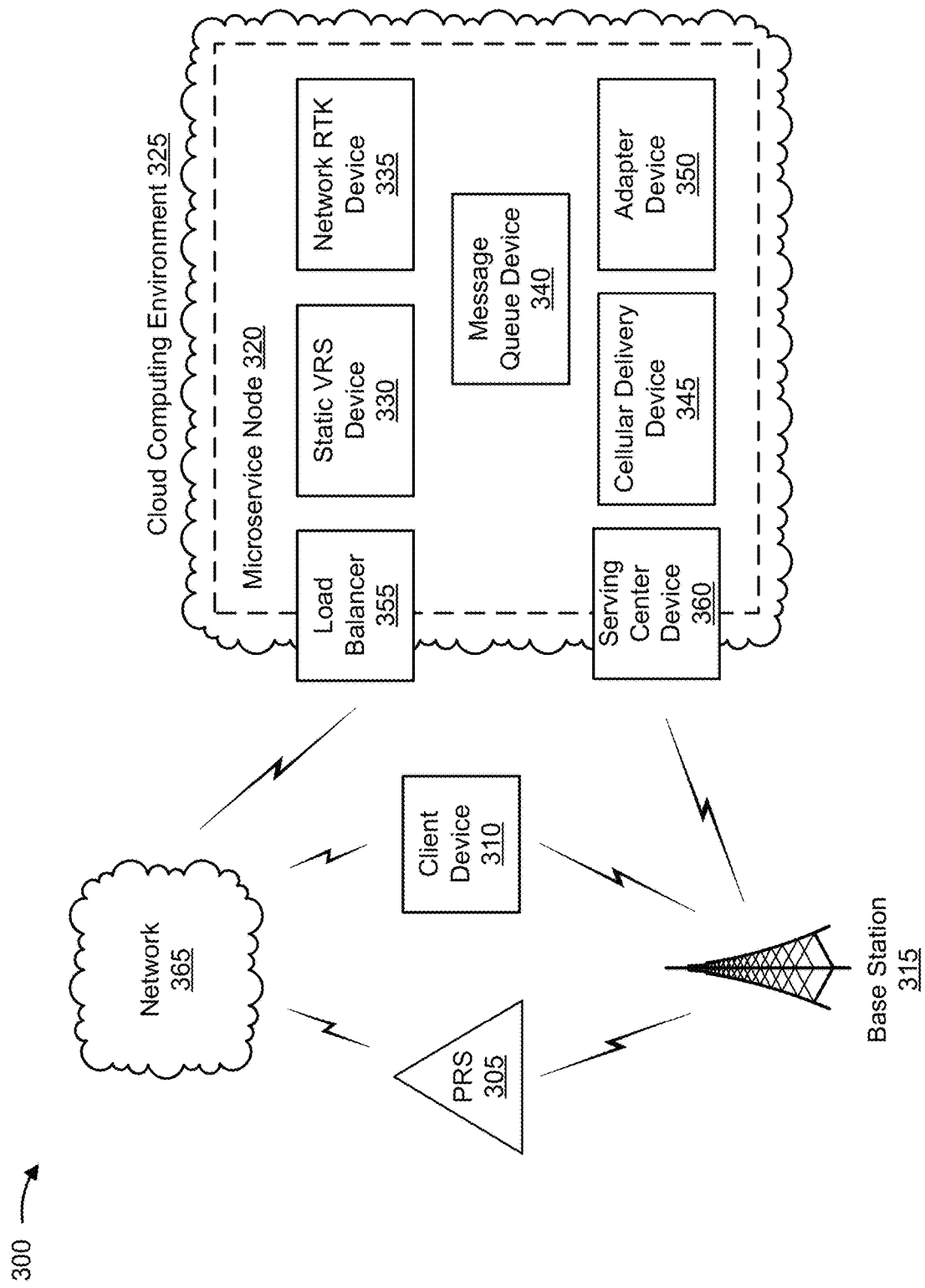
FIGS. 3A and 3B are diagrams associated with an example environment in which systems and/or methods, described herein, can be implemented.
Figure 3B:
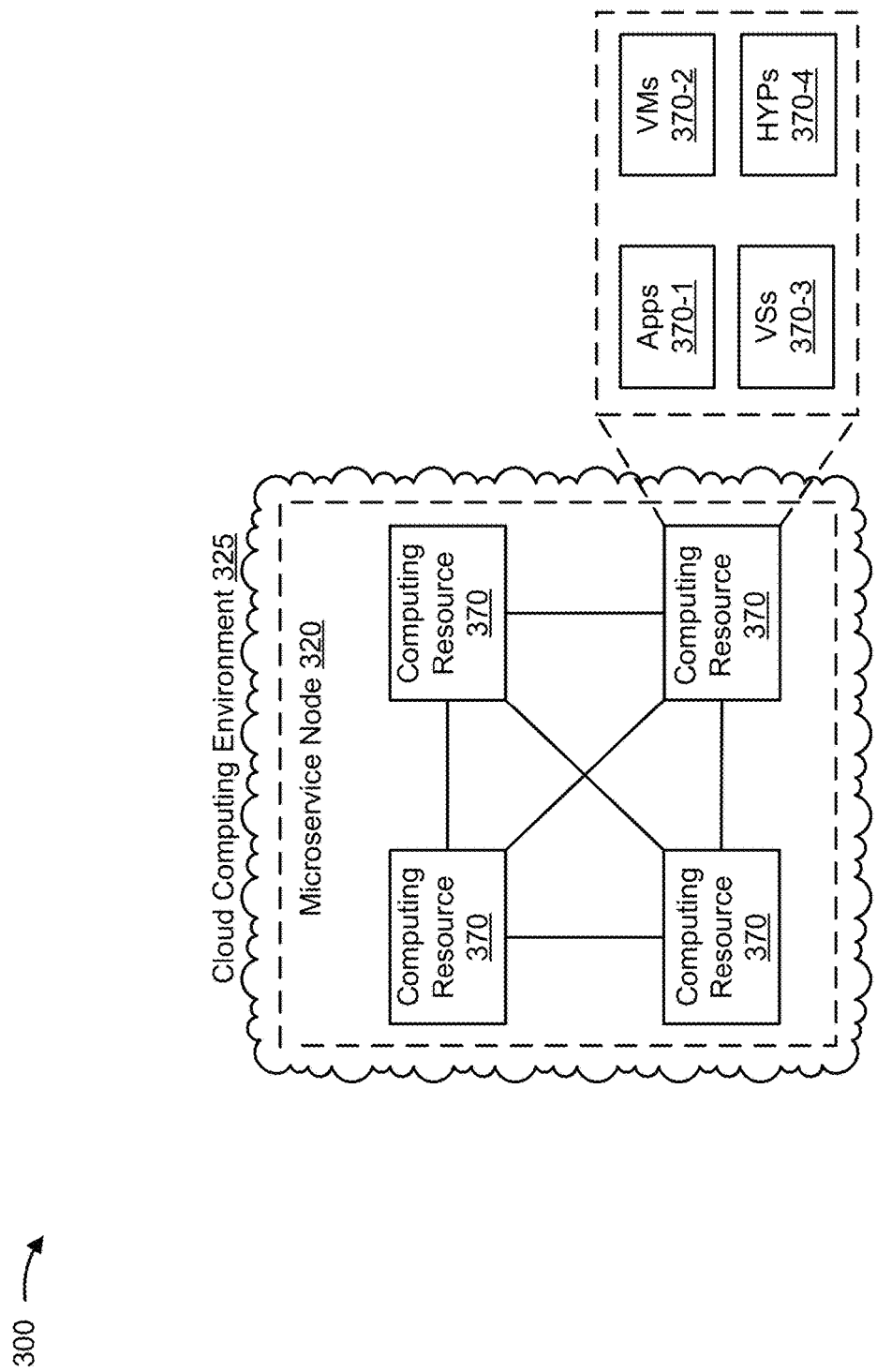

FIGS. 3A and 3B are diagrams associated with an example environment 300 in which systems and/or methods, described herein, can be implemented. As shown in FIG. 3A, environment 300 can include one or more physical reference stations 305 (herein referred to collectively as physical reference stations 305 and individually as physical reference station 305), one or more client devices 310 (herein referred to collectively as client devices 310 and individually as client device 310), one or more base stations 315 (herein referred to collectively as base stations 315 and individually as base station 315), a microservice node 320 (e.g., hosted in a cloud computing environment 325) that includes one or more load balancers 355 (herein referred to collectively as load balancers 355 and individually as load balancer 355) and one or more serving center devices 360 (herein referred to collectively as serving center devices 360 and individually as serving center device 360). Microservice node 320 can further include one or more static VRS devices 330 (herein referred to collectively as static VRS devices 330 and individually as static VRS device 330), one or more network RTK devices 335 (herein referred to collectively as network RTK devices 335 and individually as network RTK device 335), one or more message queue devices 340 (herein referred to collectively as message queue devices 340 and individually as message queue device 340), one or more cellular delivery devices 345 (herein referred to collectively as cellular delivery devices 345 and individually as cellular delivery device 345), and/or one or more adapter devices 350 (herein referred to collectively as adapter devices 350 and individually as adapter device 350). Devices of environment 300 can interconnect via wired connections, wireless connections, or a combination of wired and wireless connections.

Physical reference station 305 includes one or more devices capable of receiving, generating, storing, processing, and/or providing information associated with a hyper-accurate location service provided by microservice node 320, as described herein. For example, physical reference station 305 can include a reference receiver capable of receiving, generating, storing, processing, and/or providing information, such as raw satellite data associated with physical reference station 305, information identifying a known physical location of physical reference station 305, and/or the like, as described herein.

Client device 310 includes one or more devices capable of receiving, generating, storing, processing, and/or providing information associated with a hyper-accurate location service provided by microservice node 320, as described herein. For example, client device 310 can include an RTK-enabled communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), a stand-alone navigation device, a device that is integrated into a vehicle (e.g., a built-in navigation device, an infotainment system device, and/or the like), and/or a similar type of device. In some implementations, client device 310 can receive corrections data, associated with a static VRS agent, and can use the corrections data to correct a GNSS satellite-estimated physical location of client device 310, as observed by client device 310.

Base station 315 includes one or more devices capable of receiving, generating, storing, processing, and/or providing information associated with a hyper-accurate location service provided by microservice node 320, as described herein. For example, base station 315 can include an eNodeB associated with a Long Term Evolution (LTE) network, a gNodeB associated with a New Radio (NR) network, a base station associated with another type of radio access network (RAN), a small cell base station, such as a base station of a microcell, a picocell, and/or a femtocell, and/or the like, that receives corrections data, associated with a static VRS agent and transmits the corrections data to client device 310.

Microservice node 320 includes a system (e.g., one or more devices) capable of providing a hyper-accurate location service to client device 310, as described herein. In some implementations, the hyper-accurate location service provides an accuracy of location to within centimeters (hyper accuracy) for client device 310 (e.g., a location accuracy that is not capable of being provided by GNSS systems).

Static VRS device 330 includes one or more devices capable of generating and providing one or more static (or fixed) VRS agents. The plurality of static VRS agents can be assigned respective static virtual locations. Static VRS device 330 can transmit (e.g., via message queue device 340 and/or one or more adapter devices 350) static virtual location data, associated with a static VRS agent of the plurality of static VRS agents, to network RTK device 335. Static VRS device 330 can receive, store, and/or provide corrections data associated with a static VRS agent.

Network RTK device 335 includes one or more devices capable of generating corrections data for a static VRS agent. For example, network RTK device 335 can provide a network RTK engine that can receive raw satellite data and information identifying a known physical location associated with physical reference station 305 (e.g., via message queue device 340 and/or one or more adapter devices 350), can receive static virtual location data associated with a static VRS agent (e.g., from static VRS device 330 via message queue device 340 and/or one or more adapter devices 350), and can generate corrections data, for the static VRS agent, based on the raw satellite data, the known physical location of physical reference station 305, and the static virtual location data. In some implementations, network RTK device 335 can provide the corrections data to the static VRS agent (e.g., to static VRS device 330 via message queue device 340 and/or one or more adapter devices 350).

Message queue device 340 includes one or more devices capable of providing a message queue for communication between one or more devices included in microservice node 320, between one or more devices included in microservice node 320 and one or more devices external to microservice node 320, between one or more devices external to microservices node 320, and/or the like. In some implementations, message queue device 340 can implement an Apache Kafka cluster that includes one or more message queues. The one or more message queues can include Kafka topics. In some implementations, message queue device 340 can also be referred to as a message broker device, a messaging service device, a message bus device, and/or the like.

Cellular delivery device 345 includes one or more devices capable of providing over-the-air delivery of corrections data to client device 310. For example, cellular delivery device 345 can instruct an adapter device 350, between cellular delivery device 345 and message queue device 340, to subscribe to particular message queues associated with one or more static VRS agents.

Adapter device 350 includes one or more devices capable of providing various communications functions for the devices included in microservice node 320 and/or the devices external to microservice node 320. For example, adapter device 350 can provide a producer function that can store messages in a message queue provided by message queue device 340. As another example, adapter device 350 can provide a consumer function that can subscribe a device to a message queue to receive alerts (e.g., alerts of messages being added to the message queue) and read messages in the message queue. As another example, adapter device 350 can provide an NTRIP casting function, which can stream raw satellite data, associated with physical reference station 305, to other devices included in microservice node 320. As another example, adapter device 350 can provide a CaaS function, which can receive, from client device 310, a request for corrections data, can determine (e.g., based on a network-estimated or GNSS satellite-estimated physical location associated with client device 310) a geographic area in which client device 310 is located, can determine a static VRS agent associated with the geographic area, and can subscribe client device 310 to the message queue associated with the static VRS agent.

Load balancer 355 includes one or more devices capable of performing load balancing associated with provisioning of a hyper-accurate location service by microservice node 320. For example, one or more load balancers 355 can be arranged to perform load balancing associated with balancing multiple raw satellite data streams (e.g., provided by one or more physical reference stations 305). As another example, one or more load balancers 355 can be arranged to perform load balancing associated with balancing corrections data streams among one or more client devices 310 that use the hyper-accurate location service.

Serving center device 360 includes one or more devices capable of providing over-the-air multimedia broadcast and multicast services (MBMS) associated with provisioning of a hyper-accurate location service by microservice node 320. For example, serving center device 360 can include a BMSC device, an E-SMLC device, and/or the like that can be arranged to transmit corrections data streams to one or more base stations 315, such that the corrections data streams can be broadcasted and/or multicasted to client devices 310.

In some implementations, as shown, one or more devices of microservice node 320 can be hosted in cloud computing environment 325. Notably, while implementations described herein describe microservice node 320 as being hosted in cloud computing environment 325, in some implementations, microservice node 320 is not cloud-based (i.e., can be implemented outside of a cloud computing environment) or can be partially cloud-based. Additional details regarding cloud computing environment 325 are described below with regard to FIG. 3B.

Network 365 includes one or more wired and/or wireless networks. For example, network 365 can include a cellular network (e.g., a LTE network, a NR network, a 3G network, a CDMA network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

FIG. 3B is a diagram showing example components of cloud computing environment 325 in which one or more microservice nodes 320 can be configured. Cloud computing environment 325 includes an environment that delivers computing as a service, whereby shared resources, services, and/or the like, can be provided. Cloud computing environment 325 can provide computation, software, data access, storage, and/or other services that do not require end-user knowledge of a physical location and configuration of a system and/or a device that delivers the services. As shown, cloud computing environment 325 can include computing resources 370. In some implementations, one or more microservice nodes 320, one or more devices of a given microservice node 320, and/or one or more other devices included in cloud computing environment 325 (e.g., static VRS device 330, network RTK device 335, message queue device 340, cellular delivery device 345, adapter device 350, load balancer 355, serving center device 360, and/or the like), can be implemented using computing resources 370 of cloud computing environment 325.

Computing resource 370 includes one or more servers, groups of servers, computers, or other types of computation and/or communication devices. In some implementations, one or more computing resources 370 can be configured to operate as one or more components of one or more microservice nodes 320. Cloud resources can include compute instances executing in computing resource 370, storage devices provided in computing resource 370, data transfer devices provided by computing resource 370, and/or the like. In some implementations, computing resource 370 can communicate with other computing resources 370 via wired connections, wireless connections, or a combination of wired and wireless connections.

As further shown in FIG. 3B, computing resource 370 can include a group of cloud resources, such as one or more applications ("APPs") 370-1, one or more virtual machines ("VMs") 370-2, virtualized storage ("VSs") 370-3, one or more hypervisors ("HYPs") 370-4, or the like.

Application 370-1 includes one or more software applications that can be provided to or accessed by physical reference station 305, client device 310, and/or the like. Application 370-1 can eliminate a need to install and execute the software applications on these devices. For example, application 370-1 can include software associated with microservice node 320 and/or any other software capable of being provided via cloud computing environment 325. In some implementations, one application 370-1 can send/receive information to/from one or more other applications 370-1, via virtual machine 370-2.

Virtual machine 370-2 includes a software implementation of a machine (e.g., a computer) that executes programs like a physical machine. Virtual machine 370-2 can be, for example, a system virtual machine or a process virtual machine, depending upon use and degree of correspondence to any real machine by virtual machine 370-2. A system virtual machine can provide a complete system platform that supports execution of a complete operating system ("OS"). A process virtual machine can execute a single program, and can support a single process. In some implementations, virtual machine 370-2 can execute on behalf of a user (e.g., client device 310), and can manage infrastructure of cloud computing environment 325, such as data management, synchronization, or long-duration data transfers. In some implementations, virtual machine 370-2 can be another type of virtual machine that provides another type of virtualization. For example, virtual machine 370-2 can be an OS-level virtual machine that provides OS-level virtualization. Notably, while computing resource 370 is shown as including virtual machine 370-2, computing resource 370 can include another type of virtual device in some implementations, such as one or more virtual containers (e.g., Docker, Kubernetes, LXC, workload partitions, and/or the like).

Virtualized storage 370-3 includes one or more storage systems and/or one or more devices that use virtualization techniques within the storage systems or devices of computing resource 370. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can provide administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 370-4 provides hardware virtualization techniques that allow multiple operating systems (e.g., "guest operating systems") to execute concurrently on a host computer, such as computing resource 370. Hypervisor 370-4 can present a virtual operating platform to the guest operating systems, and can manage the execution of the guest operating systems. Multiple instances of a variety of operating systems can share virtualized hardware resources.

In some implementations, one or more microservice nodes 320 and/or one or more components of a given microservice node 320 can be implemented in one or more computing resources 370. For example, one or more microservice nodes 320 and/or one or more components of a given microservice node 320 can be implemented (as software) using one or more APPs 370-1, one or more VMs 370-2, and/or the like.

The number and arrangement of devices and networks shown in FIGS. 3A and 3B are provided as an example. In practice, there can be additional devices and/or networks, fewer devices and/or networks, different devices and/or networks, or differently arranged devices and/or networks than those shown in FIGS. 3A and 3B. Furthermore, two or more devices shown in FIGS. 3A and/or 3B can be implemented within a single device, or a single device shown in FIGS. 3A and/or 3B can be implemented as multiple, distributed devices. Additionally, or alternatively, a set of devices (e.g., one or more devices) of environment 300 can perform one or more functions described as being performed by another set of devices of environment 300.

Figure 4:
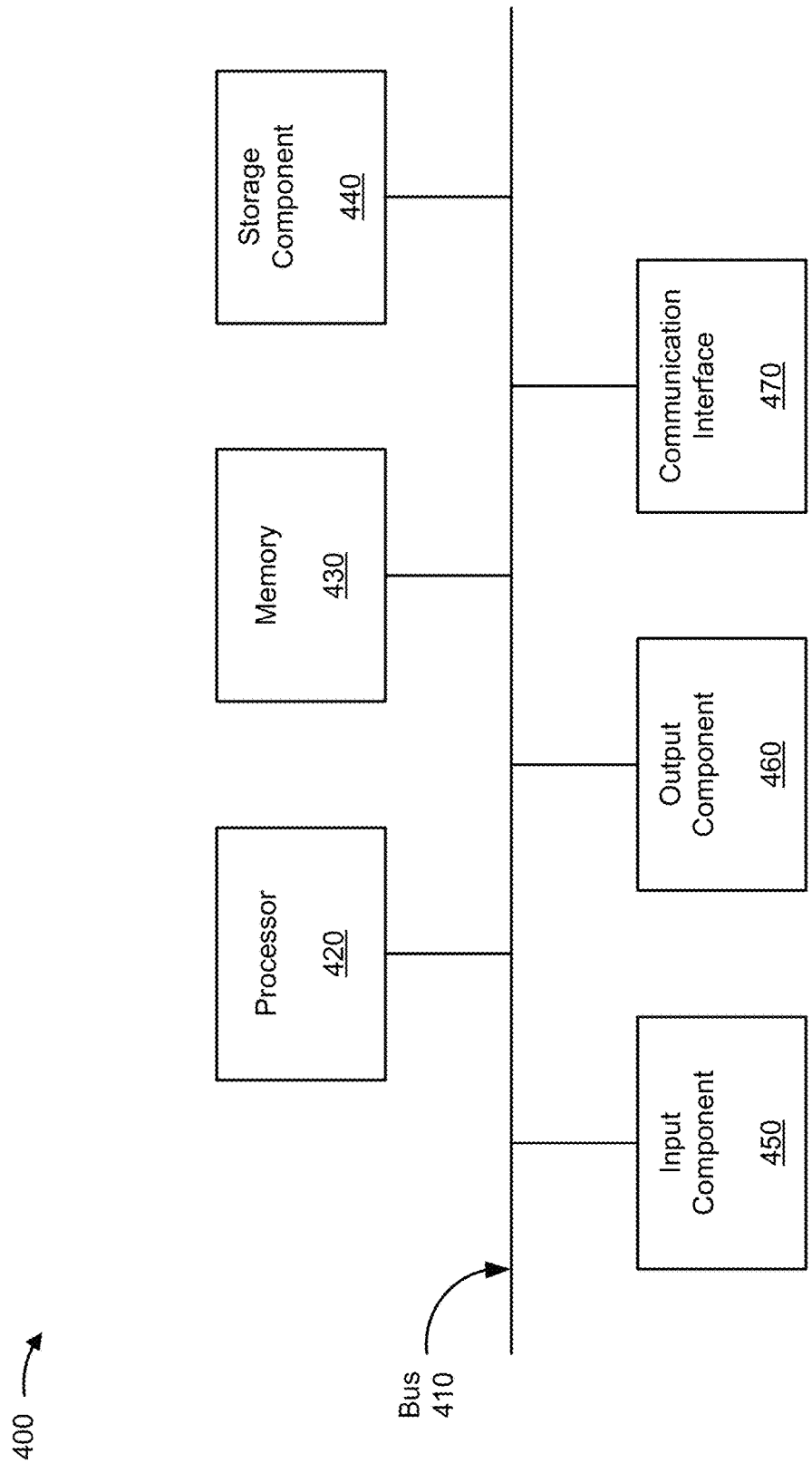
FIG. 4 is a diagram of example components of one or more devices of FIGS. 3A and/or 3B.

FIG. 4 is a diagram of example components of a device 400. Device 400 can correspond to physical reference station 305, client device 310, base station 315, microservice node 320, static VRS device 330, network RTK device 335, message queue device 340, cellular delivery device 345, adapter device 350, load balancer 355, serving center device 360, one or more devices included in network 365, and/or computing resource 370. In some implementations, physical reference station 305, client device 310, base station 315, microservice node 320, static VRS device 330, network RTK device 335, message queue device 340, cellular delivery device 345, adapter device 350, load balancer 355, serving center device 360, one or more devices included in network 365, and/or computing resource 370 can include one or more devices 400 and/or one or more components of device 400. As shown in FIG. 4, device 400 can include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 can include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 can permit device 400 to receive information from another device and/or provide information to another device. For example, communication interface 470 can include an Ethernet interface, an optical interface, a coaxial interface, an infrared interface, a radio frequency (RF) interface, a universal serial bus (USB) interface, a wireless local area network interface, a cellular network interface, or the like.

Device 400 can perform one or more processes described herein. Device 400 can perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions can be read into memory 430 and/or storage component 440 from another computer-readable medium or from another device via communication interface 470. When executed, software instructions stored in memory 430 and/or storage component 440 can cause processor 420 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 can include additional components, fewer components, different components, or differently arranged components than those shown in FIG. 4. Additionally, or alternatively, a set of components (e.g., one or more components) of device 400 can perform one or more functions described as being performed by another set of components of device 400.

Figure 5:
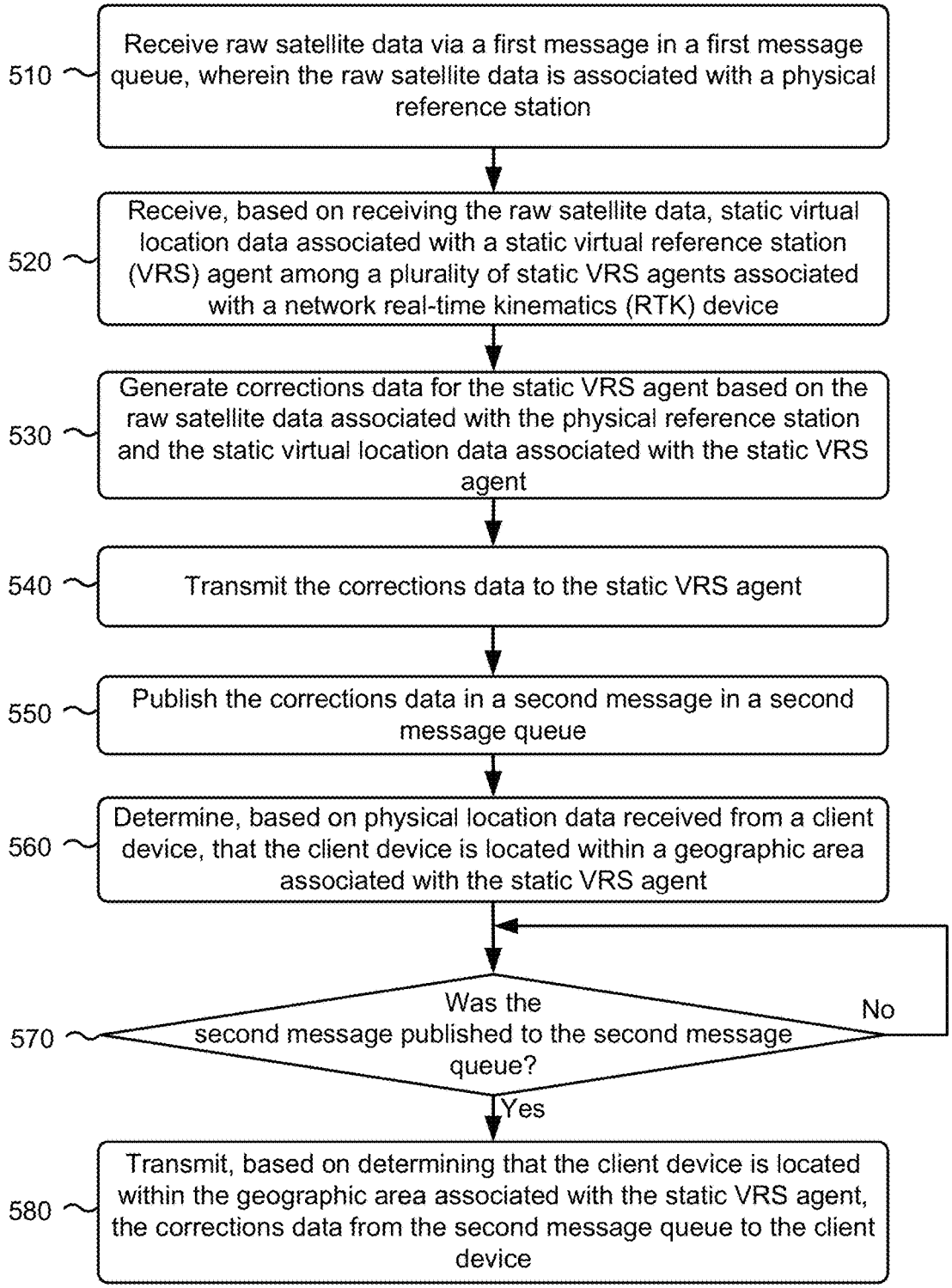
FIG. 5 is a flow chart of an example process for static virtual reference station (VRS) agents for global navigation satellite system (GNSS) corrections.

FIG. 5 is a flow chart of an example process 500 for static VRS agents for GNSS corrections. In some implementations, one or more process blocks of FIG. 5 can be performed by microservice node (e.g., microservice node 320). In some implementations, one or more process blocks of FIG. 5 can be performed by another device or a group of devices separate from or including the microservice node, such as a physical reference station (e.g., physical reference station 305), a client device (e.g., client device 310), a base station (e.g., base station 315), a load balancer (e.g., load balancer 355), a serving center device (e.g., serving center device 360), and/or the like.

As shown in FIG. 5, process 500 can include receiving raw satellite data via a first message in a first message queue, wherein the raw satellite data is associated with a physical reference station (block 510). For example, the microservice node (e.g., using network RTK device 335, computing resource 370, processor 420, memory 430, storage component 440, input component 450, output component 460, communication interface 470, and/or the like) can receive raw satellite data via a first message in a first message queue, as described above. In some implementations, the raw satellite data is associated with a physical reference station.

As further shown in FIG. 5, process 500 can include receiving, based on receiving the raw satellite data, static virtual location data associated with a static VRS agent among a plurality of static VRS agents associated with the network RTK device (block 520). For example, the microservice node (e.g., using network RTK device 335, computing resource 370, processor 420, memory 430, storage component 440, input component 450, output component 460, communication interface 470, and/or the like) can receive, based on receiving the raw satellite data, static virtual location data associated with a static VRS agent among a plurality of static VRS agents associated with the network RTK device, as described above.

As further shown in FIG. 5, process 500 can include generating corrections data for the static VRS agent based on the raw satellite data associated with the physical reference station and the static virtual location data associated with the static VRS agent (block 530). For example, the microservice node (e.g., using network RTK device 335, computing resource 370, processor 420, memory 430, storage component 440, input component 450, output component 460, communication interface 470, and/or the like) can generate corrections data for the static VRS agent based on the raw satellite data associated with the physical reference station and the static virtual location data associated with the static VRS agent, as described above.

As further shown in FIG. 5, process 500 can include transmitting the corrections data to the static VRS agent (block 540). For example, the microservice node (e.g., using network RTK device 335, computing resource 370, processor 420, memory 430, storage component 440, input component 450, output component 460, communication interface 470, and/or the like) can transmit the corrections data to the static VRS agent, as described above.

As further shown in FIG. 5, process 500 can include publishing the corrections data in a second message in a second message queue (block 550). For example, the microservice node (e.g., using static VRS device 330, computing resource 370, processor 420, memory 430, storage component 440, input component 450, output component 460, communication interface 470, and/or the like) can publish the corrections data in a second message in a second message queue, as described above.

As further shown in FIG. 5, process 500 can include determining, based on physical location data received from a client device, that the client device is located within a geographic area associated with the static VRS agent (block 560). For example, the microservice node (e.g., using adapter device 350, computing resource 370, processor 420, memory 430, storage component 440, input component 450, output component 460, communication interface 470, and/or the like) can determine, based on physical location data received from a client device, that the client device is located within a geographic area associated with the static VRS agent, as described above.

As further shown in FIG. 5, process 500 can include determining whether the second message was published to the second message queue (block 570). For example, the microservice node (e.g., using adapter device 350, computing resource 370, processor 420, memory 430, storage component 440, input component 450, output component 460, communication interface 470, and/or the like) can determine whether the second message was published to the second message queue, as described above. As further shown in FIG. 5, if the microservice node determines that the second message was not published to the second message queue (block 570-No), the microservice node can return to block 570, where the microservice node can continue to monitor the second message queue for the second message.

As further shown in FIG. 5, if the microservice node determines that the second message was added to the second message queue (block 570-Yes), process 500 can include transmitting, based on determining that the client device is located within the geographic area associated with the static VRS agent, the corrections data from the second message queue to the client device (block 580). For example, the microservice node (e.g., using adapter device 350, computing resource 370, processor 420, memory 430, storage component 440, input component 450, output component 460, communication interface 470, and/or the like) can transmit, based on determining that the client device is located within the geographic area associated with the static VRS agent, the corrections data from the second message queue to the client device, as described above.

Process 500 can include additional implementations, such as any single implementation or any combination of implementations described below and/or in connection with one or more other processes described elsewhere herein.

In some implementations, process 500 further comprises receiving respective physical location data associated with a plurality of client devices. In some implementations, determining that the client device is located within the geographic area associated with the static VRS agent comprises determining, based on the respective physical location data, that the plurality of client devices is located within the geographic area associated with the static VRS agent. In some implementations, transmitting the corrections data from the second message queue to the client device comprises transmitting the corrections data from the second message queue to the plurality of client devices.

In some implementations, the adapter device comprises at least one of a Kafka consumer function or a CaaS function. In some implementations, process 500 further comprises subscribing the client device to the second message queue based on determining that the client device is located within the geographic area associated with the static VRS agent. In some implementations, transmitting the corrections data from the second message queue to the client device comprises transmitting the corrections data from the second message queue to the client device based on determining that the second message was published to the second message queue.

In some implementations, transmitting the corrections data to the client device comprises transmitting the corrections data to the client device via a base station and a serving center device. In some implementations, transmitting the corrections data to the client device via the base station and the serving center device comprises determining that the base station serves the geographic area associated with the static VRS agent, and transmitting the corrections data to the client device based on determining that the base station serves the geographic area associated with the static VRS agent. In some implementations, the serving center device comprises at least one of a BMSC device or an E-SMLC device.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

As used herein, satisfying a threshold can, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a network real-time kinematics (RTK) device, raw satellite data via a first message in a first message queue,
      wherein the raw satellite data is associated with a physical reference station;
   receiving, by the network RTK device and based on receiving the raw satellite data, static virtual location data associated with a static virtual reference station (VRS) agent among a plurality of static VRS agents associated with the network RTK device;
   generating, by the network RTK device, corrections data for the static VRS agent based on:
      the raw satellite data associated with the physical reference station, and
      the static virtual location data associated with the static VRS agent;
   transmitting, by the network RTK device, the corrections data to the static VRS agent;
   publishing, by the static VRS agent, the corrections data in a second message in a second message queue,
      wherein the first message queue and the second message queue are provided by a message queue device that is included in a microservice node that includes the RTK device;
   determining, by an adapter device and based on physical location data received from a client device, that the client device is located within a geographic area associated with the static VRS agent; and
   transmitting, by the adapter device and based on determining that the client device is located within the geographic area associated with the static VRS agent, the corrections data from the second message queue to the client device.

2. The method of claim 1, further comprising:
   receiving respective physical location data associated with a plurality of client devices that include the client device;
   wherein determining that the client device is located within the geographic area associated with the static VRS agent comprises:
      determining, based on the respective physical location data, that the plurality of client devices is located within the geographic area associated with the static VRS agent; and
   wherein transmitting the corrections data from the second message queue to the client device comprises:
      transmitting the corrections data from the second message queue to the plurality of client devices.

3. The method of claim 1, wherein the adapter device comprises at least one of:
   a Kafka consumer function, or
   a corrections as a service (CaaS) function.

4. The method of claim 1, further comprising:
   subscribing the client device to the second message queue based on determining that the client device is located within the geographic area associated with the static VRS agent; and
   wherein transmitting the corrections data from the second message queue to the client device comprises:

transmitting the corrections data from the second message queue to the client device based on determining that the second message was published to the second message queue.

5. The method of claim 1, wherein transmitting the corrections data to the client device comprises:
transmitting the corrections data to the client device via a base station and a serving center device.

6. The method of claim 5, wherein transmitting the corrections data to the client device via the base station and the serving center device comprises:
determining that the base station serves the geographic area associated with the static VRS agent; and
transmitting the corrections data to the client device based on determining that the base station serves the geographic area associated with the static VRS agent.

7. The method of claim 6, wherein the serving center device comprises at least one of:
a broadcast multicast service center (BMSC) device, or
an evolved serving mobile location center (E-SMLC) device.

8. A microservice node, comprising:
a network real-time kinematics (RTK) device, to:
receive raw satellite data via a first message in a first message queue,
wherein the raw satellite data is associated with a physical reference station;
receive, based on receiving the raw satellite data, static virtual location data associated with a static virtual reference station (VRS) agent among a plurality of static VRS agents associated with the network RTK device;
generate corrections data for the static VRS agent based on:
the raw satellite data associated with the physical reference station, and
the static virtual location data associated with the static VRS agent; and
transmit the corrections data to the static VRS agent;
a static VRS device, to:
publish the corrections data in a second message in a second message queue;
a message queue device, to:
provide the first message queue and the second message queue; and
an adapter device, to:
determine, based on physical location data received from a client device, that the client device is located within a geographic area associated with the static VRS agent; and
transmit, based on determining that the client device is located within the geographic area associated with the static VRS agent, the corrections data from the second message queue to the client device.

9. The microservice node of claim 8, wherein the adapter device is further to:
receive respective physical location data associated with a plurality of client devices that include the client device;
wherein the adapter device, when determining that the client device is located within the geographic area associated with the static VRS agent, is to:
determine, based on the respective physical location data, that the plurality of client devices is located within the geographic area associated with the static VRS agent; and wherein the adapter device, when transmitting the corrections data from the second message queue to the client device, is to:
transmit the corrections data from the second message queue to the plurality of client devices.

10. The microservice node of claim 8, wherein the adapter device comprises at least one of:
a Kafka consumer function, or
a corrections as a service (CaaS) function.

11. The microservice node of claim 8, wherein the adapter device is further to:
subscribe the client device to the second message queue based on determining that the client device is located within the geographic area associated with the static VRS agent; and
wherein the adapter device, when transmitting the corrections data from the second message queue to the client device, is to:
transmit the corrections data from the second message queue to the client device based on determining that the second message was published to the second message queue.

12. The microservice node of claim 8, wherein the adapter device, when transmitting the corrections data to the client device, is to:
transmit the corrections data to the client device via a base station and a serving center device.

13. The microservice node of claim 12, wherein the adapter device, when transmitting the corrections data to the client device via the base station and the serving center device, is to:
determine that the base station serves the geographic area associated with the static VRS agent; and
transmit the corrections data to the client device based on determining that the base station serves the geographic area associated with the static VRS agent.

14. The microservice node of claim 13, wherein the serving center device comprises at least one of:
a broadcast multicast service center (BMSC) device, or
an evolved serving mobile location center (E-SMLC) device.

15. A non-transitory computer-readable medium storing instructions, the instructions comprising:
one or more instructions that, when executed by one or more processors, cause the one or more processors to:
receive raw satellite data via a first message in a first message queue,
wherein the raw satellite data is associated with a physical reference station;
receive, based on receiving the raw satellite data, static virtual location data associated with a static virtual reference station (VRS) agent among a plurality of static VRS agents associated with a network real-time kinematics (RTK) device;
generate corrections data for the static VRS agent based on:
the raw satellite data associated with the physical reference station, and
the static virtual location data associated with the static VRS agent;
transmit the corrections data to the static VRS agent;
publish the corrections data in a second message in a second message queue,
wherein the first message queue and the second message queue are provided by a message queue device that is included in a microservice node that includes the RTK device;

determine, based on physical location data received from a client device, that the client device is located within a geographic area associated with the static VRS agent; and transmit, based on determining that the client device is located within the geographic area associated with the static VRS agent, the corrections data from the second message queue to the client device.

16. The non-transitory computer-readable medium of claim 15, wherein the one or more instructions further cause the one or more processors to:

receive respective physical location data associated with a plurality of client devices that include the client device;

wherein the one or more instructions, that cause the one or more processors to determine that the client device is located within the geographic area associated with the static VRS agent, cause the one or more processors to:

determine, based on the respective physical location data, that the plurality of client devices is located within the geographic area associated with the static VRS agent; and wherein the one or more instructions, that cause the one or more processors to transmit the corrections data from the second message queue to the client device, cause the one or more processors to:

transmit the corrections data from the second message queue to the plurality of client devices.

17. The non-transitory computer-readable medium of claim 15, wherein the one or more instructions, when executed by the one or more processors, further cause the one or more processors to:

subscribe the client device to the second message queue based on determining that the client device is located within the geographic area associated with the static VRS agent; and wherein the one or more instructions, that cause the one or more processors to transmit the corrections data from the second message queue to the client device, cause the one or more processors to:

transmit the corrections data from the second message queue to the client device based on determining that the second message was published to the second message queue.

18. The non-transitory computer-readable medium of claim 15, wherein the one or more instructions, that cause the one or more processors to transmit the corrections data to the client device, cause the one or more processors to:

transmit the corrections data to the client device via a base station and a serving center device.

19. The non-transitory computer-readable medium of claim 18, wherein the one or more instructions, that cause the one or more processors to transmit the corrections data to the client device via the base station and the serving center device, cause the one or more processors to:

determine that the base station serves the geographic area associated with the static VRS agent; and transmit the corrections data to the client device based on determining that the base station serves the geographic area associated with the static VRS agent.

20. The non-transitory computer-readable medium of claim 19, wherein the serving center device comprises at least one of:

a broadcast multicast service center (BMSC) device, or an evolved serving mobile location center (E-SMLC) device.

* * * * *